Patented July 24, 1928.

1,678,056

UNITED STATES PATENT OFFICE.

SALADINE EUGENE COLGIN, OF DALLAS, TEXAS.

PROCESS FOR MAKING A MEAT CURATIVE.

No Drawing. Application filed April 21, 1926. Serial No. 103,646.

The present invention consists of a process for making a meat curative which will effectively impregnate the fibrous texture of the meat with a non-injurious medium for flavoring and preserving the meat in a single operation without omitting any of the characteristics of meat cured or treated by the tedious, long-drawn out and expensive method now customarily employed.

A further object of the invention is to provide a product for curing meat by a process which is relatively inexpensive yet which is productive of a merchandisable compound susceptible of application to the meat even by persons unskilled in the art to which the invention appertains.

The invention further contemplates the production of a highly refined species of smoke acid which acts upon the meat and effects the same results as have heretofore been obtained by the long drawn out smoking process customarily employed not only to smoke the meat but also to eliminate bacteria.

The process involved for the production of a meat curative in accordance with the teachings of the present invention consists in the production of a highly refined species of smoke acid or pyroligneous acid which I attain by first filling an air tight receptacle with wood and then subjecting the receptacle to an intense heat until the wood is throughly charred. During this operation the smoke generated in the retort is piped from the latter into a condenser of conventional design and the resultant liquid transferred to a refining apparatus, which may also be of conventional design. The liquid may be withdrawn from the refinery and temporarily packaged. Next, suitable ingredients for sweetening the meat, flavoring the same, assisting in its preservation, etc., are mounted in a drum or other receptacle and mingled with the acid. If desired, the ingredients used for sweetening and flavoring the meat may consist of brown cane sugar or molasses and pepper while preservatives and antiseptics, such as saltpeter and soda, may be used in conjunction with further perservative and vehicle, such as common salt. These ingredients are mingled in proper proportions and thoroughly agitated. I have found the following proportions to be effective for carrying out the teachings of the present invention.

Ten pounds of common salt;
Two pounds of brown cane sugar or molasses;
Eight ounces of saltpeter;
Four ounces of black pepper;
Two ounces of red pepper, powdered or ground;
Two ounces of common table soda; and
Sixteen fluid ounces of refined wood acid, preferably pyroligneous acid derived as set out herein.

First, all of the ingredients are deposited in the drum and thoroughly agitated until the ingredients are thoroughly admixed. Next, the pyroligneous acid is sprayed or sprinkled on the compound and the entire mass then again thoroughly agitated. This agitation takes place during the presence of heat applied to the drum and the agitation is continued until the contents of the drum is thoroughly dry. Instead of applying heat to the drum the same results can be obtained by agitating the contents of the drum in the open air. The resultant compound may then be packaged in any desired manner and is available for use in treating the meat. In applying this compound it is preferred that the meat be first subjected to a temperature of from 30° to 40° Fahrenheit for a period of from twelve to twenty-four hours. The compound is thoroughly rubbed into the meat, about ten pounds of the compound being used to one hundred pounds of meat. After the application of the compound has been completed the meat should by preference be deposited in suitable containers and allowed to remain saturated with the compound for from thirty to sixty days, depending upon the size of the meat. It has been found that this process positively cures the meat and produces such a high degree of preservation that the meat is preserved from deterioration even in the torrid zone during the hottest season.

It is of course to be understood that the present process may be varied to conform to climatic conditions, within the scope of the claim hereto appended, as it is a well known fact that bacteria is much more prevalent in low altitudes than in higher altitudes.

What is claimed is:—

A process for producing a meat curative consisting in first mingling salt, sugar, saltpeter, black and red pepper, and soda until a thorough admixture of all of the ingredients is obtained, after which pyroligneous acid is sprayed on the mass during the presence of heat and the mass agitated until thoroughly dry.

In testimony whereof I have signed my name to this specification.

SALADINE EUGENE COLGIN.